United States Patent [19]

Rongo

[11] Patent Number: 6,011,241

[45] Date of Patent: Jan. 4, 2000

[54] METHOD OF ADJUSTING WELD PARAMETERS TO COMPENSATE FOR PROCESS TOLERANCES

[75] Inventor: Robert Rongo, Danville, Ind.

[73] Assignee: Cybo Robots, Inc., Indianapolis, Ind.

[21] Appl. No.: 09/030,075

[22] Filed: Feb. 25, 1998

[51] Int. Cl.$^7$ .................................................. B23K 9/095
[52] U.S. Cl. .............................. 219/124.34; 219/137.71
[58] Field of Search ...................... 219/127.34, 130.21, 219/137.71, 125.1, 125.11

[56] References Cited

U.S. PATENT DOCUMENTS

| | | |
|---|---|---|
| 3,612,818 | 10/1971 | Bechtle et al. . |
| 3,855,446 | 12/1974 | Kotova et al. . |
| 4,272,665 | 6/1981 | Steigerwald . |
| 4,532,404 | 7/1985 | Boillot et al. . |
| 4,608,481 | 8/1986 | Nomura et al. . |
| 4,613,743 | 9/1986 | Nied et al. . |
| 4,621,185 | 11/1986 | Brown . |
| 4,724,302 | 2/1988 | Penney et al. . |
| 4,816,641 | 3/1989 | Sugitani et al. . |
| 5,107,093 | 4/1992 | Ekelöf et al. . |
| 5,532,452 | 7/1996 | Lechner et al. ............. 219/124.34 |
| 5,864,115 | 1/1999 | Ikeda et al. ............... 219/124.34 |

*Primary Examiner*—Clifford C. Shaw
*Attorney, Agent, or Firm*—Maginot, Addison & Moore

[57] ABSTRACT

An adaptive welding method and apparatus adjusts the amount of weld material deposited in a fillet weld based on gap width and gap orientation. The method includes the step of obtaining nominal area information identifying a nominal weld cross sectional area between a first plate and a second plate to be welded. The method further includes the step of obtaining gap width information identifying a width of a gap between the first plate and the second plate. The method still further includes the step of determining a supplemental area defining the cross sectional area in excess of the nominal weld cross sectional area, the determination based on the gap width information and a predetermined gap orientation. The method yet further includes the step of controlling one or more weld parameters based on the nominal area information and the determined supplemental area.

18 Claims, 6 Drawing Sheets

METHOD OF ADJUSTING WELD PARAMETERS TO COMPENSATE FOR PROCESS TOLERANCES

GOVERNMENT LICENSE

The U.S. Government has a paid-up licence in this invention and the right in limited circumstances to require the patent owner to licence others on reasonable terms, as provided by the terms of Government Contract DTMA 91-94-H-00019, awarded by the U.S. Department of Transportation, Maritime Administration.

FIELD OF THE INVENTION

The present invention relates generally to an adaptive welding method, and more specifically to a method of adjusting weld parameters to compensate for process tolerances.

BACKGROUND OF THE INVENTION

Many repetitive and mechanical manufacturing operations, for example, welding, are increasingly being automated through the use of programmable robots. Thus, for example, robotic welding systems are experiencing widespread use. In robotic welding systems, repeated welding operations may be programmed into a robot controller for automatic operation.

During certain welding operations, it is often necessary to weld large plates together in a substantially perpendicular relationship. For plates that are welded in such a manner, a fillet weld is often used to join the plates. A fillet weld is essentially right-triangular in cross-section, with each side of the right triangle that contacts the one of the two plates referred to as a leg. The size of a fillet weld is often characterized in terms of leg length. The leg length is advantageously selected such that the fillet weld provides a bond of adequate strength between the two plates.

The controller in a robotic welding system that performs fillet welds uses leg length information to determine the wire feed rate, the weave size and/or the weld velocity travel which are then used to control the robot and the associated welding tool. For example, if a leg length of 15 mm is utilized, the controller may use that information in connection with other parameters to control the travel velocity of the robotic welder.

A problem arises, however, when such robotic devices are employed in welding applications that have fixturing tolerances. Specifically, due to varying tolerances in the manufacture of plates, there is often a gap between the two plates when they are fixtured for welding purposes. The welding process must often be adjusted to account for the gap. For example, once the width of the gap exceeds a certain threshold value, the leg length must be extended to ensure the strength of the fillet weld. By extending the leg length, more well material is required to form the fillet weld. Programmed robotic devices, however, are typically designed for predefined operation and do not typically self-adjust to compensate for gap variations from piece to piece.

Another drawback associated with the gap between the two plates is that a quantity of weld material can be lost to the gap from the fillet weld. In particular, as the fillet weld is being formed, molten weld material flows from the fillet weld into the gap between the two plates thereby requiring additional weld material in order to create the fillet weld. As the width of the gap between the plates increases, the amount of weld material lost to the gap increases. It has also been observed that the amount of weld material lost in the gap depends to some degree on the orientation of the weld, or in other words, whether the weld is an overhead weld, a vertical weld or a horizontal weld.

The increased weld material requirements resulting from the gap between the plates typically does not create a significant problem in manual welding operations. In manual operations, the welder may continuously observe the weld and the gap and determine on an ad hoc basis whether to use more welding material. However, in preprogrammed robotic welding operations, if no feedback information pertaining to the gap is provided, the controller will not adjust the welding parameters to account for the gap.

Adaptive welding processes have been developed that use a microprocessor to analyze sensor information and control a number of weld parameters based on the sensor information. Typically, adaptive welding processes have been used to control the position of a welding torch in order produce a weld that follows an irregular welding path. One such device is described in U.S. Pat. No. 4,621,185 to Brown. Such devices, however, do not account for increased weld material requirements due to the appearance of a gap between plates of a fillet weld.

Other adaptive welding processes use feedback from a sensor to observe the weld spot or weld bead during the welding operation and adjust welding parameters based on the feedback. Processes of this nature would appear to have some effectiveness in accounting for variations in welding requirements caused by a gap between two plates. A device that uses such a process is described in U.S. Pat. No. 4,724,302. These processes, however, require that a sensor constantly gather data, for example visual data, from an active welding operation at the point of the weld. That requirement is undesirable because the volatility of the welding operation may damage the sensor, or cause the sensor to provide inaccurate data.

What is needed therefore is an apparatus and method for automatically adjusting the weld parameters to account properly for the effects of a gap between two plates to be welded together without requiring continuous information regarding the weld spot or weld bead. A further need exists for such a method that also accounts for the weld material lost in the gap during the welding operation.

SUMMARY OF THE INVENTION

The present invention addresses the above needs, as well as others, by providing a method and apparatus for controlling a welding operation that adjusts welding parameters based on measured gap width information and gap orientation information. By using gap width and orientation information, the method of the present invention can adjust welding parameters to account for fixturing tolerances without requiring an in-process measurement of a weld spot.

In accordance with a first embodiment of the present invention, there is provided method of controlling a welding operation. The method includes the step of obtaining nominal area information identifying a nominal weld cross sectional area (based on a nominal leg length) for a weld between a first plate and a second plate. The method further includes the step of obtaining gap width information identifying a width of a gap between the first plate and the second plate. The method still further includes the step of determining a supplemental area defining the cross sectional area in excess of the nominal weld cross sectional area, the determination based on the gap width information and a predetermined gap orientation. The method yet further includes the step of controlling one or more weld parameters based on the nominal area information and the determined supplemental area. The determined supplemental area is representative of, or is an estimate of, the amount of weld material that is lost in the gap between the first plate and the second plate.

In accordance with a second embodiment of the present invention, there is provided a welding apparatus that includes a welding torch assembly, a memory device for storing data, and a processing unit. In general, the processing unit controls the welding torch assembly using welding parameters stored in the memory device. The processing unit is also operable to obtain a nominal weld cross sectional area (based on a nominal leg length) from said memory device. The processing unit is further operable to obtain information identifying a width of a gap between said first plate and said second plate from said memory device. The processing unit is then operable to determine a supplemental area defining said cross section area in excess of said nominal weld cross sectional area, said determination is based on said width of said gap an da gap orientation. Finally, the processing unit is operable to adjust one or more of weld parameters based on said nominal area and said supplemental area.

This invention has the advantage of determining a supplemental area which is an estimate of the weld material lost to a gap. The weld parameters are adjusted accordingly to ensure a weld of substantially uniform strength regardless of the quantity of weld material lost to the gap. The determination of the supplemental area is based on gap orientation information and gap width information. This invention further has the advantage of controlling one or more weld parameters to compensate for the supplemental area of weld material lost to the gap.

The above features and advantages, as well as others, will become readily apparent to those of ordinary skill in the art by reference to the following detailed description and accompanying drawings.

DETAILED DESCRIPTION

Figure 1:
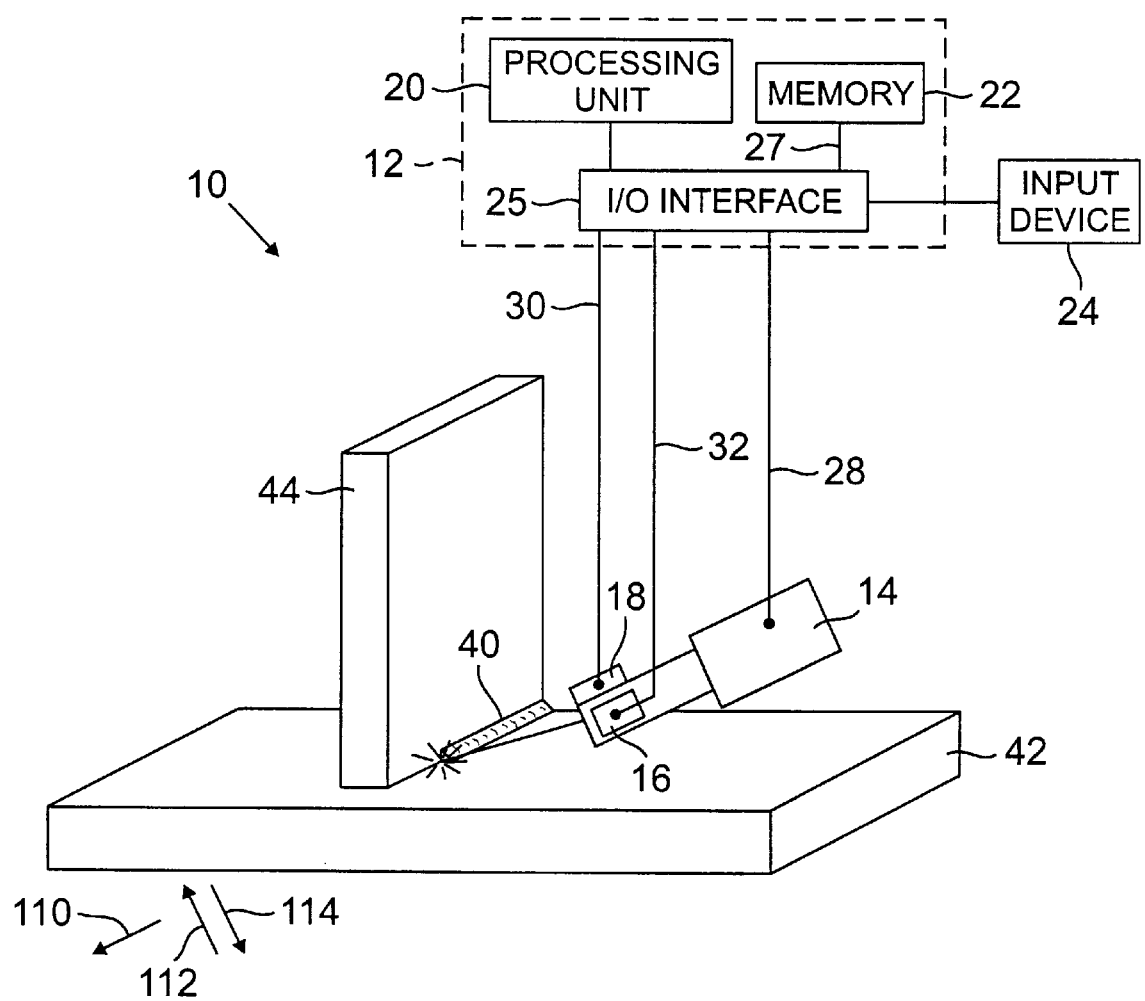
FIG. 1 is a perspective view of the welding torch assembly which incorporates the features of the present invention therein, note that the control unit is shown in schematic for clarity of description.

While the invention is susceptible to various modifications and alternative forms, a specific embodiment thereof has been shown by way of example in the drawings and will wherein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a welding torch assembly 10. The welding torch assembly 10 includes a control unit 12, a movement device 14, a wire feed mechanism 16 and a sensor 18. The welding torch assembly 10 moves along a fillet weld 40 defined between a first plate 42 and a second plate 44. The movement device 14 is operable to move the welding torch assembly 10 in a forward travel direction in the general direction of arrow 110 as well as a side to side oscillation in the general direction of arrows 112 and 114 to distribute the weld material at a given location of the fillet weld 40. The sensor 18 is operable to provide visual image information at a given location of the fillet weld 40.

The control unit 12 includes a processing unit 20, a memory device 22, an I/O interface 25, and an input device 24. The memory device 22, input device 24 and outputs are coupled to the processing unit 20 via the I/O interface 25 which may suitably be the native bus of the processing unit 20. The input device 24 is coupled to the processing unit 20 through a data communication line 26 and the I/O interface 25. The input device 24 may include a keyboard, keypad, or other means of inputting data such as a LAN connection. The processing unit 20 may suitable by a microprocessor or other processing component that is operable to execute program instructions in the memory device 22 to control the welding operations carried out by the welding torch assembly 10. The memory device 22 may suitably be a combination of read-only memory and random access memory which store program instructions for the microprocessor, weld parameters and other data.

The movement device 14 may suitably be a robotic arm or other device that is operable to move the welding torch assembly 10 generally along the path of the fillet weld 40 in a forward travel while superimposing a side to side cross seam weaving motion. The movement device 14 is coupled to the processing unit 20 via a data communication line 28 and I/O interface 25. In general, the processing unit 20 sends control signals to the movement device 14 to control the position of the welding torch assembly 10. In particular, the processing unit 20 provides control signals that dictate the forward travel velocity and the side to side weaving oscillation. Furthermore, the movement device 14 sends feedback information to the processing unit 20 via the communication line 28 and I/O interface 25 which allows the processing unit 20 to monitor the position and velocity of the movement device 14.

In the exemplary embodiment, the sensor 18 is an optical sensor. It should be appreciated that the optical sensor may readily be replaced by and alternative sensing means having comparable sensing capabilities. The sensor 18 is in communication with the processing unit 20 via a data communication line 30 and the I/O interface 25. In particular, the sensor 18 is operable to provide weld information signals, for example, those including weld joint fit up information, to the processing unit 20. Such weld information signals also include information identifying a width of a gap 50 between the first plate 42 and the second plate 44. It should be appreciated that the sensor 18 can provide continuous real-time information signals to the processing unit 20 via the line 30 while a welding operation is in progress or can provide information signals pertaining to a weld process prior to commencement of the weld process.

The wire feed mechanism 16 is a device that controllably supplies welding wire to the fillet weld 40. The welding wire may be any suitable consumable welding electrode. The processing unit 20 communicates with the wire feed mechanism 16 via an interface 25 and a line 32. In general, the processing unit 20 sends control signals to the wire feed mechanism 16 in order to change the rate at which the welding wire is fed into the fillet weld 40.

It will be appreciated that the detailed implementation discussed herein, for example, the data communication and interface details, are given by way of example only. Those of ordinary skill in the art may readily devise their own methods and circuits for effecting communications among a processor, a movement device for a robot, a wirefeed mechanism for a robot, and an input device.

Figure 2:
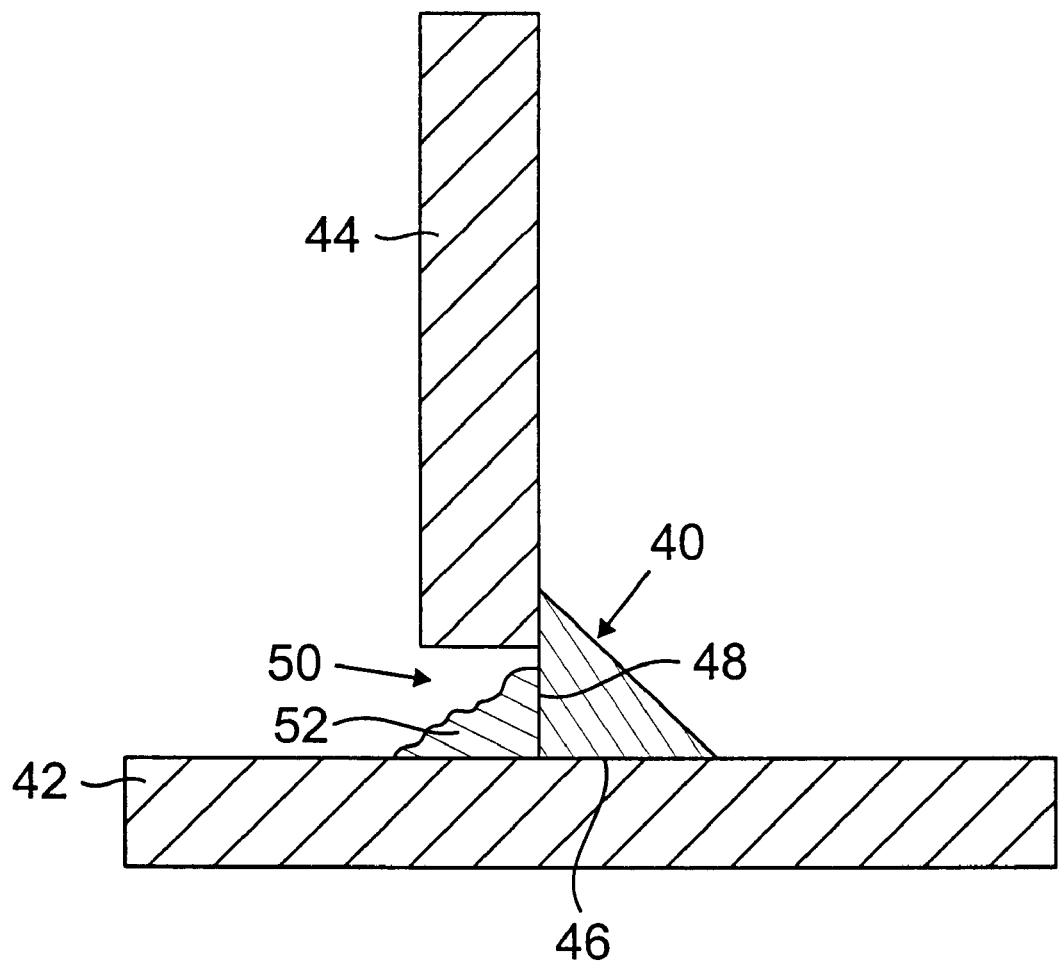
FIG. 2 is a cross sectional view of a fillet weld created by the welding torch assembly of FIG. 1.

Referring now to FIGS. 1 and 2, in operation the processing unit 20 obtains nominal area information identifying a fillet weld 40 with a nominal leg length between the first plate 42 and a second plate 44 to be welded. The nominal area information is typically derived from defined leg length for the weld. In particular, fillet welds are often defined by leg length, which is the length of material along each dimension of the weld occupied by the plates. For example, the fillet weld 40 has a first leg 46 bordering the first plate and second leg 48 bordering the second plate 44. The fillet weld area is assumed to be substantially right triangular in an orthogonal fillet weld, such as the fillet weld 40. Accordingly, the nominal area information may be obtained by taking the one half of the product of the length of the first leg 46 and the length of the second leg 48. The processing unit 20 obtains the nominal leg length from either the memory device 22 or he input device 24 and converts the nominal leg length information to nominal area information.

It will be noted that while the nominal area information is used for the operations described herein, the same operations may be readily modified to use the leg length information if desired.

In addition to nominal area information, the processing unit 20 obtains information identifying the width of the gap 50 between the first plate 42 and the second plate 44. In an ideal welding operation, the fillet weld 40 is formed with no gap between the first plate 42 and the second plate 44. However, in many cases a gap 50 exists between the first plate 42 and the second plate 44 due to variances in the manufacture and/or fixturing of the first plate 42 and the second plate 44. To this end, the processing unit 20 sends control signals to the sensor 18 to scan, i.e. obtain visual image information, and extract gap width information from the visual image information. Products capable of extracting gap width information from the image information are known, such as model Quick Eye model 104 available from Cybo Robots, Inc. of Indianapolis, Ind.

The processing unit 20 then determines the supplemental area 52 defining the cross sectional area in excess of the nominal cross sectional area that is required to form the fillet weld 40. The supplemental area 52 represents the amount of weld material that is predicted to be lost in the gap 50 during the welding process. In particular, it has been observed that an amount of molten welding material will flow into the gap 50 during welding. The processing unit 20 accounts for the material lost in the gap by defining a supplemental area 52 which represents a prediction of the amount of material that will be lost in the gap 50.

The processing unit 20 determines the supplemental area 52 based on the gap width information and preferably gap orientation information, both of which will affect the amount of material lost in the gap 50. To this end, the processing unit 20 accesses functions that provide supplemental area as a function of gap width, and gap orientation. Such functions may be developed in accordance with the process illustrated in FIG. 5, discussed below. In any event, once the supplemental area 52 is determined, the processing unit 20 then controls or adjusts one or more weld parameters based on the nominal area information and the determined supplemental area to supply an amount of weld material per unit length to the fillet weld 40 equal to the sum of the nominal cross sectional area and the supplemental area 52.

Furthermore, in order to form a weld of the desired strength, the length of one or both of the legs must be adjusted in some circumstances to compensate for the lost contact area between the legs and the plates. For example, if the width of the gap 50 exceeds a predetermined threshold value, then the second leg 48, which is adjacent to the gap 50, must be extended in order to form the fillet weld 40 with the required contact area between the second plate 44 and fillet weld 40.

Figure 3:
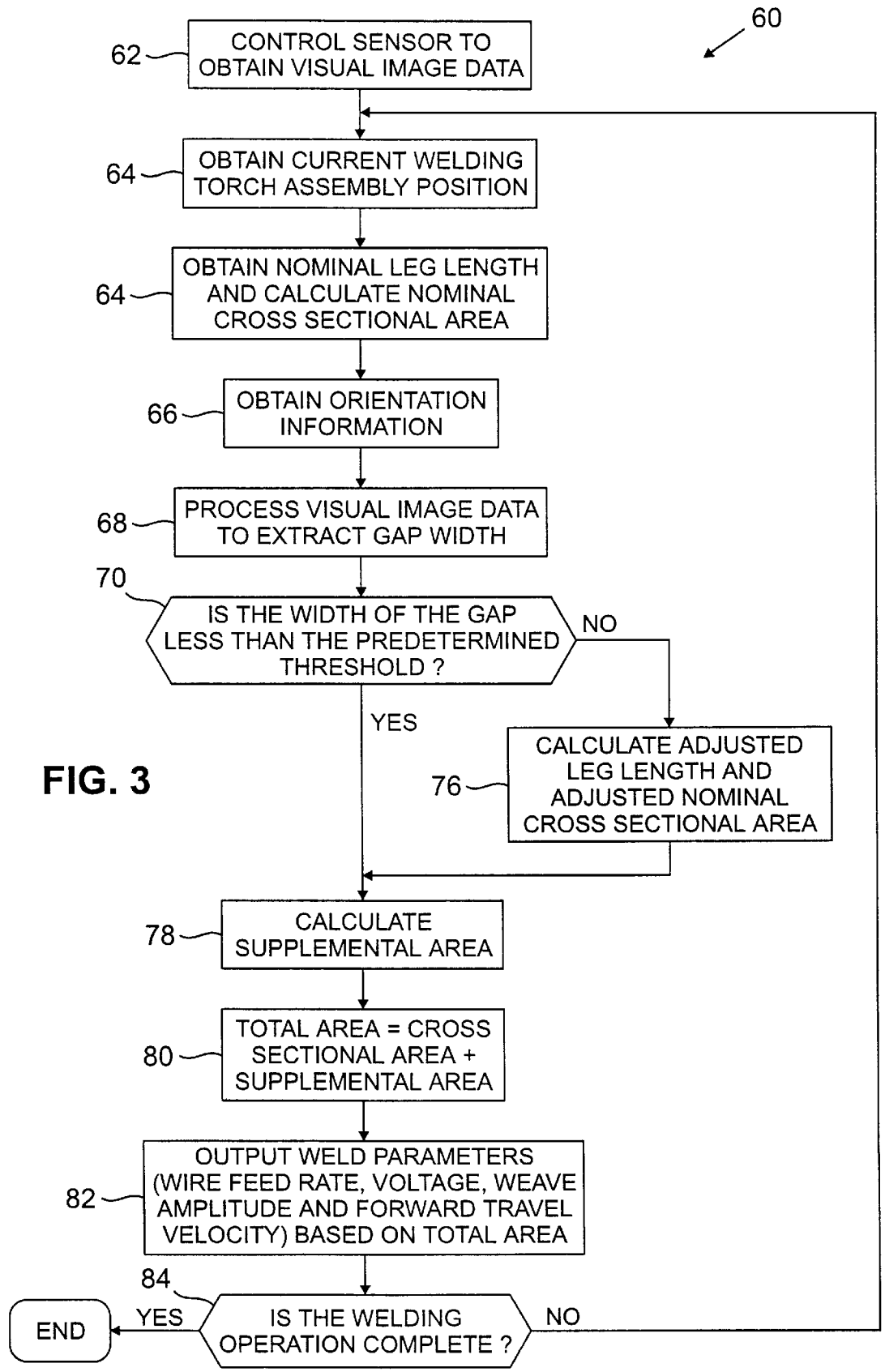
FIG. 3 is a flowchart setting forth the welding routine which controls the welding torch assembly of FIG. 1.

Referring now to FIG. 3, there is shown a flowchart setting forth the welding routine 60 of an exemplary control program executed by the controller in an automated welding device such as the welding torch assembly 10 of FIG. 1. In the embodiment described herein, the processing unit 20 of FIG. 1 executes the steps in the welding routine 60 of FIG. 3. The welding routine 60 is initialized by entering the nominal weld parameters into the memory device 22 of the control unit 12. In the exemplary embodiment described herein, the weld parameters are entered via the input device 24 during or prior to the welding operation. The weld parameters include information identifying the type of material being welded, the type of welding wire, and the voltage required by the welding torch assembly 10. Additionally, the weld parameters include the nominal leg length and the predetermined threshold value for the gap 50 based on accepted welding standards for the given application. The weld parameters further include information regarding the orientation of the gap 50 with respect to fillet weld 40 and forward travel direction. After obtaining all of the initialization information the welding routine 60 begins with step 62.

In step 62, the processing unit 20 send control signals to the sensor 18 in order to obtain visual image information on the fillet weld 40. In the present embodiment, the processing unit 20 sends control signals to the sensor 18 that instruct the sensor 18 obtain visual image information for the entire length of the fillet weld 40 prior to any welding operation.

Alternatively, the visual image information may be continuously supplied during the welding operation as an output signal from the sensor 18 to the processing unit 20 via the data communication line 30. Typically, the sensor 18 would obtain visual information for unwelded areas, or in other words, downstream the path of the welding torch assembly 10. The advantage of obtaining continuous visual image information is that the visual image information, would accurately reflect variations due to thermal distortions in either the first plate 42 or the second plate 44.

In any event, the visual image information is stored in the memory device 22. According to the present embodiment, the welding routine 60 then advances to step 63. In step 63, the current position of the welding torch assembly 10 is obtained or determined. As will be discussed below, the weld parameters often vary as a function of a position. The current position of the welding torch assembly 10 may be derived from the previously determined position (or starting position), the forward travel velocity, and the time elapsed. After obtaining current position information for the welding torch assembly 10, the welding routine 60 then advances to step 64.

In step 64, processing unit 20 obtains the nominal leg length corresponding to the current position of the welding torch 10. In particular, the nominal leg length is a predetermined value, based on accepted welding standards or test data with adequate safety margins, which corresponds to the type of welding operation being performed. Typically, the nominal leg length information is entered during the initialization of the control program. However, the nominal leg length can be entered in the input device 24 via user input or a LAN.

It is noted that in straight linear welds such as the one illustrated in FIGS. 1 and 2, the nominal leg length typically does not vary as a function of the position of the weld torch assembly 10. In such cases, the processing unit 20 need only obtain the nominal leg length once during the entire weld operation with respect to the weld. In other cases, however, such as those involving plates having irregular shapes, the nominal leg length may vary. The embodiment described herein provides the greatest degree of flexibility by obtaining a nominal leg length value that corresponds to the current position of the weld torch.

In any event, once the leg length information is obtained, the processing unit 20 also calculates the nominal cross sectional area of the weld for the current position of the weld torch assembly 20. The nominal cross sectional area can be determined as the triangular area defined by the first leg 46 and the second leg 48 shown in FIG. 2. The nominal cross sectional area is calculated using the following equation:

$$A_N = \tfrac{1}{2} b \cdot h$$

where $A_N$ is the nominal cross sectional area, b is the length of the first leg 46, and h is the length of the second leg 48. The length of both the first leg 46 and the second leg 48 are set to a nominal leg length. After obtaining the nominal cross sectional area of the fillet weld 40, the welding routine 60 advances to step 66.

In step 66, the processing unit 20 obtains gap orientation information for the current position of the weld torch assembly 20. As discussed above, the orientation of the gap 50 with respect to he fillet weld 40 affects the flow of weld material to the supplemental area 52. Typically, the gap orientation formation is entered during the initialization of the control program. However, the gap orientation information can be entered via the input device 24 by user input or LAN.

It will be noted that relatively simple weld operations will have only one gap orientation which will not vary as a function of the position of the weld torch assembly 10. Nevertheless, the functionality provided by step 66 allows the processing unit 20 to control complex weld operations having a plurality of orientations.

In general, there are six possible orientations of the gap 50 with respect to the fillet weld 40 (see FIGS. 4A–4F). Each of the gap orientations either enhances the flow of weld material from the fillet weld 40 to the supplemental area 52, or inhibits the flow of weld material from the fillet weld 40 to the supplemental area 52.

Figure 4A:
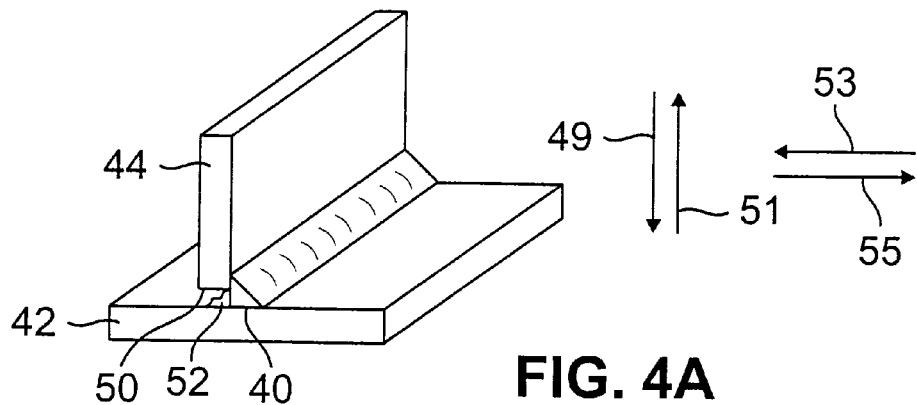
FIGS. 4(A)–4(F) are perspective views of six common orientations of a gap with respect to a fillet weld.

FIG. 4A shows the second plate 44 vertically positioned above the horizontal first plate 42 with the fillet weld 40 above the first plate 42 and the gap 50 beside the fillet weld 40. This type of weld is typically know as a horizontal weld. When the weld material in the fillet weld 40 is in the molten state, the force of gravity acting in the general direction of arrow 51 enhances the flow of weld material from the fillet weld 40 to the supplemental area 52 in the general direction of arrow 53.

Figure 4B:
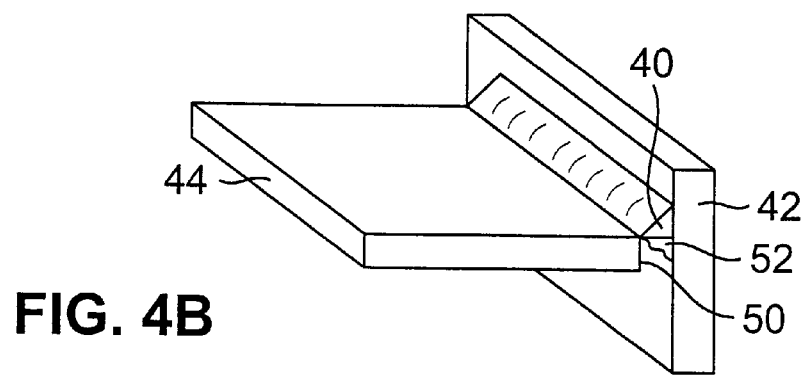

FIG. 4B shows the second plate 44 horizontally positioned beside the vertically positioned first plate 42 with the fillet weld 40 positioned above the second plate 44 and the gap 50 positioned below the fillet weld 40. This type of weld is also referred to as a horizontal weld. However, the gap 50 shown in FIG. 4B has a different orientation with respect to the fillet weld 40 than the gap 50 shown in FIG. 4A. When the weld material in the fillet weld 40 is in the molten state, the force of gravity acting in the general direction of arrow 51 enhances the flow of weld material from the fillet weld 40 to the supplemental area 52 in the general direction of arrow 51. Note that this orientation of the gap 50 with respect to the fillet weld 40 would allow the most weld material to advance to the supplemental area 52 from the fillet weld 40.

Figure 4C:
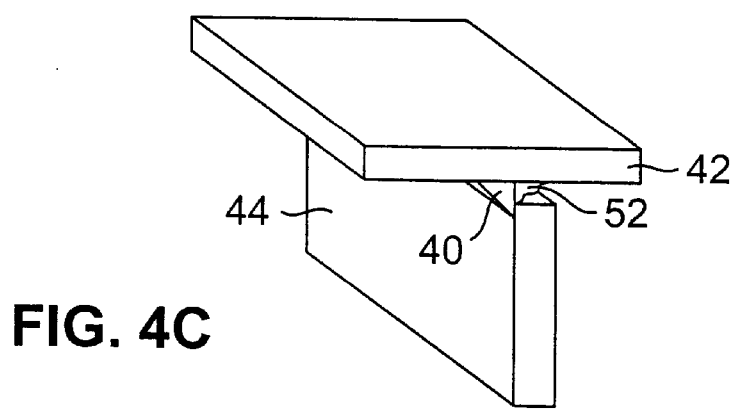

FIG. 4C shows the second plate 44 vertically positioned below the first plate 42 with the fillet weld 40 below the first plate 42 and the gap 50 beside the fillet weld 40. This type of weld is referred to as an overhead weld. When the weld material in the fillet weld 40 is in the molten state, the force of gravity acting in the general direction of arrow 51 enhances the flow of weld material from the fillet weld 40 to the supplemental area 52 in the general direction of arrow 55. Note that this orientation of the gap 50 with respect to the fillet weld 40 would allow the advancement of a smaller amount of weld material into the supplemental area 52 than the orientation shown in FIG. 4A.

Figure 4D:
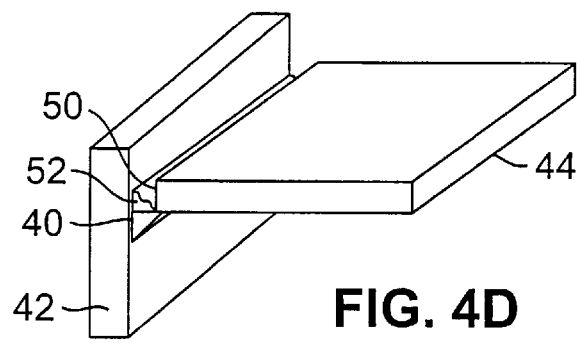

FIG. 4D shows the second plate 44 horizontally positioned beside the vertically positioned first plate 42 with the fillet weld 40 positioned below the second plate 44 and the gap 50 positioned below the fillet weld 40. This type of weld is also referred to as an overhead weld. When the weld material in the fillet 40 is in the molten sate, the force of gravity acting in the general direction of arrow 51 inhibits the flow of weld material from the fillet weld 40 to the supplemental area 52 in the general direction of arrow 49. Note that this orientation of the gap 50 with respect to the fillet weld 40 would advance the least amount of weld material into the supplemental area 52 from the fillet weld 40.

Figure 4E:
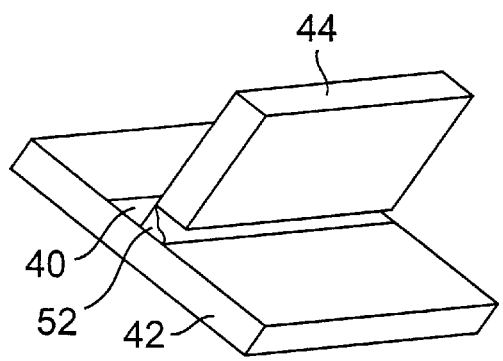

FIG. 4E shows the second plate 44 positioned at approximately a forty five degree angle from the reference plane and the first plate 42 is positioned perpendicular to the second plate 44 with the fillet weld 40 positioned between the second plate 44 and the gap 50 positioned below the fillet weld 40. This type of weld is referred to as a flat position weld. When the weld material in the fillet 40 is in the molten state, the force of gravity acting in the general direction of arrow 51 enhances the flow of weld material from the fillet weld 40 to the supplemental area 52 in the general direction of arrow 51. Note that this orientation of the gap 50 with respect to the fillet weld 40 would advance an amount of weld material to the supplemental area 52 similar to the amount advanced by the horizontal weld shown in FIG. 4B.

Figure 4F:
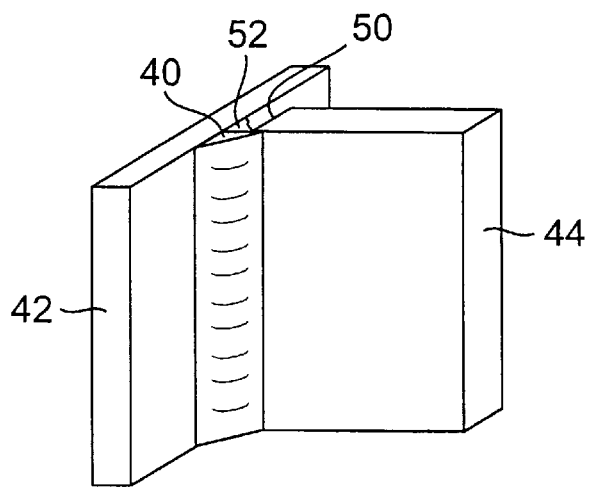

FIG. 4F shows the second plate 44 positioned vertically, with the first plate 42 also positioned vertically and perpendicular to the second plate 44. The fillet weld 40 is positioned between the second plate 44 and the first plate 42 with the gap 50 positioned behind the fillet weld 40. This type of weld is referred to as a vertical up weld. When the weld material in the fillet 40 is in the molten state, the force of gravity acting in the general direction of arrow 51 enhances the flow of weld material to the supplemental area 52 in the general direction of arrow 55. Note that this orientation of the gap 50 with resect to the fillet weld 40 would advance an intermediate amount of weld material to the supplemental area 52. The amount of weld material advanced is less than the amount of weld material advanced in horizontal weld shown in FIG. 4B but greater than the amount of weld material advanced in the overhead weld shown in FIG. 4D.

After obtaining the orientation information of the gap 50 with respect to the fillet weld 40, the routine then advances to step 68.

In step 68, the processing unit 20 extracts gap width information, i.e. with width of the gap 50, from the visual image information obtained in step 62. In particular, the processing unit 20 obtains the gap width corresponding to the current position of the weld torch assembly 10.

During welding operations, the processing unit 20 may extract the gap width information either from data stored the memory device 22 or directly from the output of the sensor 18. For the embodiment described herein, in which the sensor 18 obtains visual image information for the entire length of the fillet weld 40 prior to any welding operation, the gap width information must be extracted from data stored in the memory device 22. In particular, the processing unit 20 extracts the gap width information from visual image information stored in the memory device 22 that corresponds to current position of the welding torch assembly 10.

After obtaining the gap width information for the current position of the welding torch assembly 10 in step 68, the welding routine 60 advances to step 70. In step 70, processing unit 20 compares the current width of the gap 50 to a predetermined threshold value. The predetermined threshold value identifies the maximum width of the gap 50 that is tolerable without increasing the nominal cross sectional area of the weld, or in other words, the leg length. If the gap 50 exceeds the threshold value, the leg length of the fillet weld 40 must be increased to ensure an adequate contact or fusion surface between the fillet weld 40 and the first plate 42 and the second plate 44.

The predetermined threshold value, like the nominal leg length, is based on accepted welding standards or test data and includes adequate safety margins. The value set for each predetermined threshold depends upon, among other things, the material composition of the first plate 42 and the second plate 44. In any event, if the width of the gap 50 is less than the predetermined threshold value, then the welding routine 60 advances to step 78. If the width of the gap 50 exceeds the predetermined threshold value, then the welding routine 60 advances to step 76.

In step 76, the processing unit 20 determines the appropriate leg length adjustment based on the gap width, and then recalculates the nominal cross sectional area of the weld 40. In the embodiment described here, only one leg length is adjusted to compensate for the gap. To this end, the processing unit 20 first calculates an adjusted nominal leg length for the second leg 48 of the fillet weld 40. The nominal leg length of the second leg 48 is increased in order to maintain an adequate fusion surface between the second plate 44 and the fillet weld 40. In the alternative, the nominal leg length of both the first leg 46 and the second leg 48 may be increased to produce a symmetrical weld. Whether one or both leg lengths are increased to accommodate a large gap width is a matter of design choice and in many cases is dictated by welding standards.

The amount that the leg length must be increased is also governed by welding standards. One standard requires that the leg length be increased by an amount equal to the amount that the width of the gap 50 exceeds the predetermined threshold value. For example, in the present embodiment, if the width of the gap 50 equal 3.4 mm and the threshold value is equal to 1.6 mm, then the gap 50 would exceed the predetermined threshold value by 1.8 mm. Thus, the nominal leg length of the second leg 48 would be increased by 1.8 mm in order to maintain the strength of the weld between the second plate 44 and the fillet weld 40.

In any event, once the processing unit 20 determines the appropriate adjustment, the adjusting nominal leg length is stored in the memory device 22. Accordingly, in the embodiment described herein, the adjusted nominal leg length for the second leg 48 is then entered into the memory device 22.

The processing unit 20 then calculates an adjusted nominal cross sectional area of weld material in the fillet weld 40 based on the adjusted nominal leg length or lengths. In particular, the adjusted nominal cross sectional area is the triangular area defined by the first leg 46 and the second leg 48. The adjusted nominal area is calculated using the following equation:

$$A_{aN} = \tfrac{1}{2} b \cdot h_a$$

where $A_{aN}$ is the adjusted nominal area, b is the nominal leg length of the first leg 46, and $h_a$ is the adjusted nominal leg length of the second leg 48. To carry out the calculation, the processing unit 20 first retrieves the length of both the first leg 46 and the second leg 48 from the memory device 22. After calculating the adjusted nominal cross sectional area of the fillet weld 40, the welding routine 60 advances to step 78.

In step 78, the processing unit 20 calculates the supplemental area 52 for the current position of the weld torch assembly 10. This calculation is an estimate of the cross sectional area of weld material lost to the gap 50. In particular, the processing unit 20 calculates a supplemental area 52 that corresponds to test data obtained for fillet welds 40 with various widths of the gap 50 and various orientations of the gap 50 with respect to the fillet weld 40. More specifically, the processing unit 20 accesses a function that provides the supplemental area 52 as a function of gap orientation and gap width. Such a function may be a series of subfunctions such as those generated by a function generation method 90 discussed below in connection with FIG. 5. The processing unit 20 employs the accessed function, as well as the gap orientation information obtained in step 66 and the gap width information extracted in step 68, to calculate an estimate of the amount of weld material that will flow to or in other words, be lost in, the supplemental area 52. After calculating the supplemental area 52 for the current position of the weld torch assembly 10, the welding routine 60 then advances to step 80.

In step 80, the processing unit 20 calculates the amount of weld material per unit length required to produce the fillet weld 40. In particular, the amount of weld material per unit length is the sum of the nominal area of the fillet weld 40 and the supplemental area 52. It should be appreciated that the nominal area is defined herein as the nominal cross sectional area obtained in step 64 if the width of the gap 50 is less than the predetermined threshold value, or as the adjusted nominal cross sectional area calculated in step 76 if the width of the gap 50 exceeds the predetermined threshold value. It should further be appreciated that the supplemental area 52 obtained in step 78 is a function of the orientation of the gap 50 with respect to the fillet weld 40 as well as the width of the gap 50. After determining the amount of weld material per unit length required, the welding routine 60 then advances to step 82.

In step 82, the processing unit 20 controls a number of weld parameters based on the position of the welding torch assembly 10. The relationship between the wire feed rate and the forward travel velocity are governed by the following equation:

$$r_{wf} \pi r^2 \cdot \eta = A_{tot} \cdot v_{ft}$$

where $R_{wf}$ is the wire feed rate, r is the radius of the wire, $\eta$ is the efficiency of deposition (i.e. The amount of wire deposited in the fillet weld 40 as percentage of the total wire fed to the welding torch), $A_{tot}$ is the total area of weld material per unit length in the fillet weld 40 and the supplemental area 52 calculated in step 80, and $v_{ft}$ is the forward travel velocity of the torch assembly 10 in the general direction of arrow 110 of FIG. 1.

In particular, the processing unit 20 sends control signals to the wire feed mechanism 16 to control the feed rate $R_{wf}$ of the wire feed mechanism 16. More specifically, if in step 80 it is determined that the weld material per unit length $A_{tot}$ has increased since the last determination, then the rate $R_{wf}$ at which welding wire is advanced from the wire feed mechanism 16 may be increased. Contrariwise, if in step 80 it is determined that the weld material per unit length $A_{tot}$ has decreased since the last determination, then the rate $R_{wf}$ at which welding wire is advanced from the wire feed mechanism 16 may be decreased.

It should be appreciated that only a portion of the welding wire is deposited into the fillet weld 40 and the supplemental area 52 during the welding operation. The efficiency η is the fraction of weld material that gets deposited compared to the total amount of weld material advanced from the wire feed mechanism 16. Typically, for the flux cored wire, about eighty percent of the weld material advanced from the wire feed mechanism 16 is deposited to the fillet weld 40 and the supplemental area 52 whereas twenty percent of the weld material advanced from the wire feed mechanism 16 is vaporized or generates a waste product known as slag and is not deposited in the fillet weld 40 or the supplemental area 52. The control program must make an adjustment to the weld parameters to account for the weld material lost as vapor during the welding operation. Any change in the wire feed rate $R_{wf}$ requires a change in the torch voltage. The relationship between the wire feed rate $R_{wf}$ and the torch voltage is well known and the torch voltage is adjusted accordingly by the processing unit 20.

Alternatively, instead of controlling the feed rate $R_{wf}$ of the wire feed mechanism 16, the processing unit 20 may provide control signals to the movement device 14 to control the forward travel velocity $v_{ft}$ of the torch assembly 10 in the general direction of arrow 110 shown in FIG. 1. In particular, if the processing unit 20 determines that required weld material per unit length, $A_{tot}$, calculated in step 80 has decreased, then increasing the forward travel velocity $v_{ft}$ of the torch assembly 10 decreases the amount of weld material deposited per unit length in the same manner to decreasing the wire feed rate $R_{wf}$. Conversely, if the processing unit 20 determines that required weld material per unit length, $A_{tot}$, calculated in step 80 has increased, then decreasing the forward travel velocity $v_{ft}$ of the torch assembly 10 increases the amount of weld material deposited per unit length. Thus, the processing unit 20 may adjust weld parameters by either adjusting the feed rate for the wire feed mechanism 16 or the movement rate for the movement device 14 which allows the welding torch assembly 10 to deposit the total amount of weld material per unit length calculated in step 80 into the fillet weld 40 and the supplemental area 52.

It should be appreciated that as the welding torch assembly 10 advances in the general direction of arrow 110, the movement device 14 also moves the welding torch assembly 10 in an oscillating or weaving pattern back and forth in the general directions of arrows 112 and 114 of FIG. 1. Weaving back and forth in the general direction of arrows 112 and 114 does not change the volume of deposited weld material, but it does change the distribution. For example, as length of the first leg 46 and the second leg 48 are increased, the movement device 14 must increase the amplitude at which the welding torch weaves back in forth in the general directions of arrows 112 and 114 in order to distribute weld material to from the first leg 46 and the second leg 48 with increased lengths.

In another alternative, both the wire feed rate and the movement rate, as opposed to one or the other, will be controlled. In any event, after controlling the weld parameters, the welding routine 60 then advances to step 84.

In step 84, the processing unit 20 determines if the welding torch assembly 10 has completed the current welding operation. To this end, the processing unit 20 determines if the current position of the welding torch assembly 10 corresponds to the end position of the fillet weld 40. If so, then the welding operation is complete. If not, however, the processor unit 20 continues the welding operation by returning to step 64 and proceeding as described above.

Figure 5:
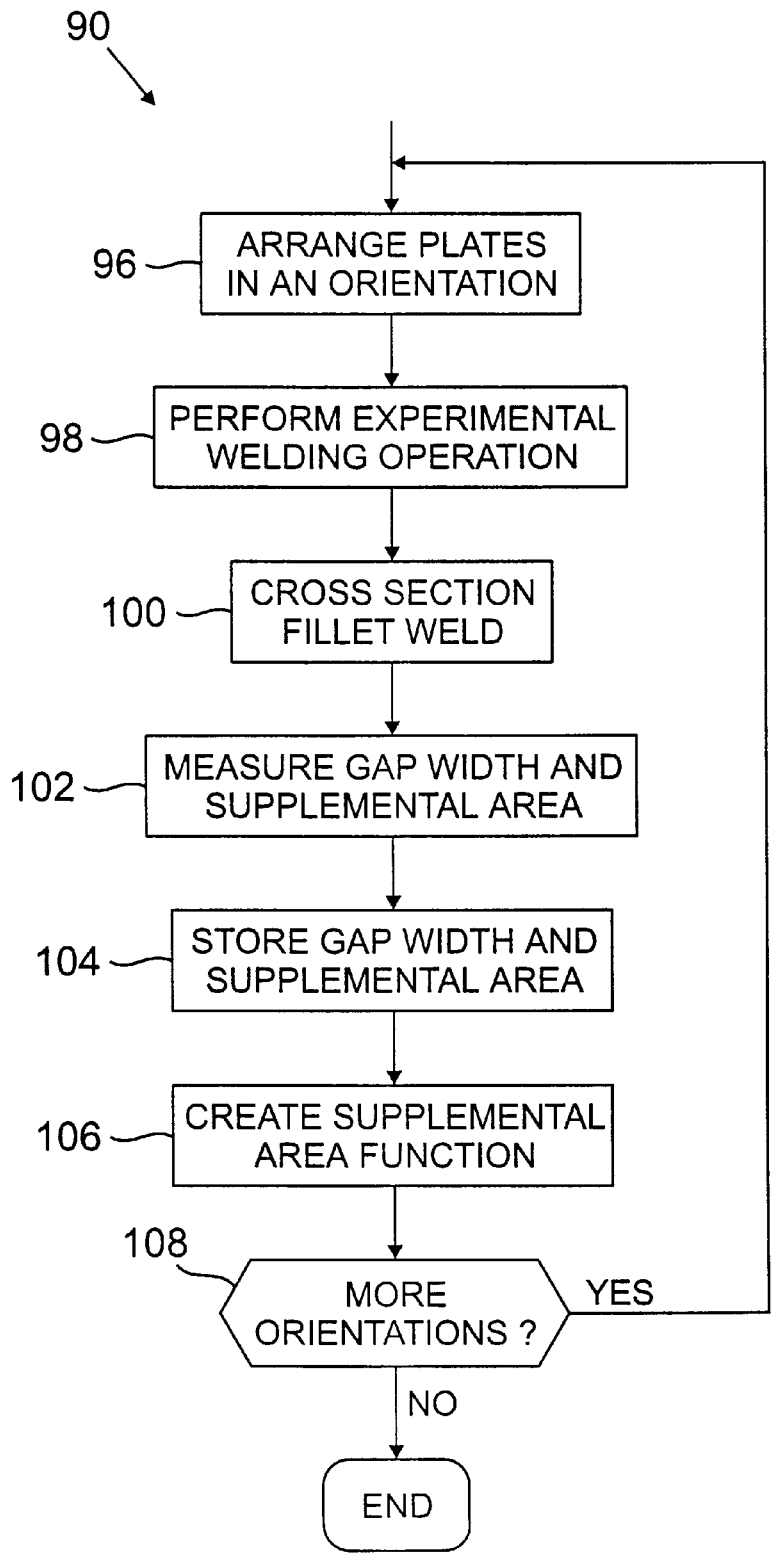
FIG. 5 is a flowchart setting forth the function generation method which generates a function that allows the calculation of the amount of weld material in the supplemental area.

Referring now to FIG. 5, there is shown the function generation method 90 which provides the function used to calculate the supplemental area 52. The method is carried out by a technician in order to set up the welding routine 60. In particular, the function generation method 90 processes empirical data from a number of experimental welding operations in order to determine the function used in step 78 of the welding routine 60.

The function generation method 90 begins with a step 96 where the first plate 42 and the second plate 44 are arranged in a select orientation of the orientations shown in FIG. 4A through 4F. It should be appreciated that the select orientation preferably corresponds to an orientation that is anticipated for a subsequent welding operation which uses the welding routine 60. The unction generation method 90 then advances to step 98.

In step 98, an experimental welding operation, or a number of experimental welding operations are performed. In particular, each of the welding operations is performed at a given gap orientation and includes a range of widths of the gap 50. It should be appreciated that the experimental welding operation is best be performed manually. Manual operation of the welding torch assembly 10 allows an experience welder to adjust the well parameters to compensate for the weld material lost to the supplemental area 52 in order to produce a fillet weld 40 with the required leg length or adjusted lag length. After completing the experimental welding operation, the function generation method 90 then advances to step 100.

In step 100, the fillet weld 40 is physically examined to determine the amount of weld material lost to the supplemental area 52 from the fillet weld 40. In particular, the first plate 42, the second plate 44, the fillet weld 40, and the supplemental area 52 are sectioned in various locations to produce cross sections similar the cross section shown in FIG. 2. The cross sections are ground an polished to highlight the weld material deposited in the fillet weld 40 and supplemental area 52. The function generation method 90 then advances to step 102.

In step 102, various measurements are made from the cross sections created in step 100. The width of the gap 50 is measured to identify the gap width that corresponds to the supplemental area 52. An estimate of the supplemental area 52 is also made. The supplemental area 52 mast be estimated because the flow of weld material through the gap 50 may cause the supplemental area 52 to form with an irregular cross sectional shape similar to the shape shown in FIG. 2. The supplemental area 52 represents the amount of weld material per unit length that flows from the fillet weld 40 into the gap 50. The function generation routine 90 then advances to step 104.

In step 104, the estimate of the supplemental area 52 along with the corresponding width of the gap 50 and the orientation of the gap 50 with respect to the fillet weld 40 are stored. In particular, if the calculation of the empirical relationship is performed by the technician, the values will be stored by some external means, such as a personal computer. Alternately, the calculation of the empirical relationships can be performed by the processing unit 20. In such a case, the measurements are entered into the memory device 22 via the input device 24. A number of measurements are required to establish a mathematical relationship between the width of the gap 50 and the supplemental area 52 for similar welds. For example, ten cross sections may be measured for each of the expected orientations of the gap 50 with respect to the fillet weld 40 in order to provide ten estimates of the supplemental area 52 along with ten corresponding measurements of the width of the gap 50. The function generation method 90 then advances to step 106.

In step 106, a technician would analyze the data stored in step 104 and identify a best fit curve for the data determine relationships between the supplemental area 52 and width of the gap 50 for the select gap orientation. Alternately, the processing unit 20 analyzes the data stored in step 104 and uses a mathematical method to produce a function from the data stored in the memory device 22. In particular, for the select orientation of the gap 50 with respect to the fillet weld 40, the function enables the calculation of the supplemental area 52 for a given width of the gap 50. It should be appreciated that a number of different functions could be derived from the information identifying the supplemental area 52. The function could be a linear, a cubic or a higher level equation. Test experience has shown that weld material in the supplemental area 52 can be approximated by a linear equation as a function of width of the gap 50 for each orientation of the gap 50 with respect to the fillet weld 40. Thus, for the select orientation of the gap 50 with respect to the fillet weld 40, a linear function is calculated that defines the supplemental area 52 as a linear function of the width of the gap 50.

For example, the following relationships illustrate an exemplary linear equation of supplemental area 52 as a function of the width of the gap 50 for a horizontal weld similar to the fillet weld shown in FIG. 4A with a nominal leg length of 7 mm:

$$A_s = 4.59 \cdot W_g$$

where $A_s$ is the supplemental area 52 in (mm)$^2$, and $W_g$ is the width of the gap 50 in mm. In any event, the linear equation calculated from the experimental welding data, indexed by the orientation of the gap 50, is then stored in the memory device 22. The function generation method 90 then advances to step 108.

In step 108, the processing unit determines whether functional relationships for all anticipated gap orientations have been generated. In particular, the operations described above are repeated for each anticipated orientation of the gap for a given weld operation. Accordingly, if there are additional orientations for which functional relationships have not been generated, then the function generation method 90 returns to step 96 and repeats the above described process using a new select orientation. If, however, functional relationships for all anticipated gap orientations have been generated, then the function generation method 90 is complete.

Consequently, for each orientation of the gap 50 with respect to the fillet weld 40, a function or set of functions is calculated and stored in the memory device 22 in step 106 of the function generation method 90. The processing unit 20 may then retrieve the functions during the execution of step 78 of the welding routine 60 (See FIG. 4) to calculate the amount of weld material lost to the supplemental area 52 from the fillet weld 40 for a given width and orientation of the gap 50.

While the present invention has been illustrated and described in detail in the drawings the foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A method of controlling a welding operation, the method comprising the steps of:

obtaining nominal area information identifying a nominal weld cross sectional area between a first plate and a second plate to be welded;

obtaining gap width information identifying a width of a gap between the first plate and the second plate;

determining a supplemental area defining the cross sectional area in excess of the nominal weld cross sectional area, the determination based on the gap width information and a predetermined gap orientation; and controlling one or more weld parameters based on the nominal area information and the determined supplemental area.

2. The method of claim 1 further comprising a step of determining adjusted nominal area information if the width of the gap exceeds a predetermined threshold, wherein:

the controlling step further comprises adjusting said one or more weld parameters based on the determined supplemental area and the adjusted nominal area information.

3. The method of claim 2 wherein the step of determining the supplemental area further comprises:

obtaining a select supplemental area relationship based at least in part on a gap orientation value, and using the select supplemental area relationship to determine the supplemental area.

4. The method of claim 3, wherein obtaining the select supplemental area relationship includes obtaining a select supplemental area relationship that comprises one or more linear functions, each linear function corresponding to one of a plurality of orientations of the gap.

5. The method of claim 1, wherein the welding torch further includes a wire feed mechanism, and the controlling step includes the step of adjusting the rate at which the wire feed mechanism supplies wire to the welding torch.

6. The method of claim 1, wherein the welding torch further includes a movement device which moves the welding torch from a first location to a second location, and the controlling step includes the step of adjusting the rate at which the movement device moves from the first location to the second location.

7. An apparatus for controlling one or more weld parameters of an automated welding device, said weld parameters including a movement rate and a wire feed rate of said automated welding device, the apparatus comprising:

a) a memory device for storing weld parameters;

b) a weld torch assembly operable to perform a weld between a first plate and a second plate; and c) a processing unit connected to said memory device and said weld torch assembly, said processing unit being operable to obtain weld parameters from said memory and control the operation of the weld torch assembly based on said weld parameters, obtain nominal area information identifying a nominal weld cross sectional area between a first plate and a second plate from said memory device, obtain gap width information identifying a width of a gap between said first plate and said second plate from said memory device, determine a supplemental area defining a cross section area in excess of said nominal weld cross sectional area, said determination based on said gap width information and a predetermined gap orientation, and adjust one or more of said weld parameters based on said nominal area information and said supplemental area.

8. The apparatus of claim 7, further comprising a sensor, wherein said sensor provides said memory device with said gap width information the width of the gap between said first plate and said second plate.

9. The apparatus of claim 8, wherein said sensor comprises an optical sensor.

10. The apparatus of claim 7, wherein said weld torch assembly further comprises a wire feed mechanism which is operable to supply wire to said welding torch at a controllably variable rate, and wherein said processing unit is further operable to cause said wire feed mechanism to adjust the rate at which wire is supplied to said welding torch based on the adjusted weld parameters.

11. The apparatus of claim 7, wherein the weld torch assembly further comprises a movement device which moves said welding torch along a joint between said first plate and said second plate, and wherein said processing unit is further operable to cause said movement device to adjust the rate at which the welding torch moves along said joint.

12. The apparatus of claim 11, wherein said movement device comprises a robotic arm.

13. An apparatus for controlling one or more weld parameters of an automated welding device, said weld parameters including a movement rate and a wire feed rate of said automated welding device, the apparatus comprising:

a) a memory device for storing weld parameters;

b) a weld torch assembly operable to perform a fillet weld between a first plate and a second plate; and c) a processing unit connected to said memory device and said weld torch assembly, said processing unit being operable to obtain weld parameters from said memory and control the operation of the weld torch assembly based on said weld parameters, obtain nominal area information identifying a nominal weld cross sectional area between a first plate and a second plate from said memory device, obtain gap width information identifying a width of a gap between said first plate and said second plate from said memory device, determine a supplemental area defining a cross section area in excess of said nominal weld cross sectional area, said determination based on said gap width information, and adjust one or more of said weld parameters based on said nominal area information and said supplemental area.

14. The apparatus of claim 13, further comprising a sensor, wherein said sensor provides said memory device with said gap width information the width of the gap between said first plate and said second plate.

15. The apparatus of claim 14, wherein said sensor comprises an optical sensor.

16. The apparatus of claim 13, wherein the weld torch assembly further comprises a wire feed mechanism which is operable to supply wire to said welding torch at a controllably variable rate, and wherein said processing unit is further operable to cause said wire feed mechanism to adjust the rate at which wire is supplied to said welding torch based on the adjusted weld parameters.

17. The apparatus of claim 13, wherein the weld torch assembly further comprises a movement device which moves said welding torch along a joint between said first plate and said second plate, and wherein said processing unit is further operable to cause said movement device to adjust the rate at which the welding torch moves along said joint.

18. The apparatus of claim 17, wherein said movement device comprises a robotic arm.

* * * * *